US007671930B2

United States Patent
Lin

(10) Patent No.: US 7,671,930 B2
(45) Date of Patent: Mar. 2, 2010

(54) LIQUID CRYSTAL DISPLAY PIXEL STRUCTURE HAVING SUB-PIXELS WITH PARTICULAR CAPACITANCE

(75) Inventor: Shih-Hsuan Lin, Yilan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 154 days.

(21) Appl. No.: 11/739,110

(22) Filed: Apr. 24, 2007

(65) Prior Publication Data

US 2008/0106664 A1    May 8, 2008

(30) Foreign Application Priority Data

Nov. 8, 2006    (TW) ............... 95141291 A

(51) Int. Cl.
*G02F 1/1343* (2006.01)
*G02F 1/136* (2006.01)

(52) U.S. Cl. ............... 349/39; 349/38; 349/48; 349/143

(58) Field of Classification Search ............ 349/38, 349/39, 49, 48
See application file for complete search history.

(56) References Cited

U.S. PATENT DOCUMENTS 5,289,300 A * 2/1994 Yamazaki et al. ............ 349/42
5,408,252 A * 4/1995 Oki et al. ............ 345/205
7,034,789 B2   4/2006 Takeuchi et al.
2004/0001167 A1 1/2004 Takeuchi et al.
2005/0036091 A1* 2/2005 Song ............ 349/129

FOREIGN PATENT DOCUMENTS

JP    2000122097    4/2000

* cited by examiner

*Primary Examiner*—Andrew Schechter
*Assistant Examiner*—Michael Inadomi
(74) *Attorney, Agent, or Firm*—Jianq Chyun IP Office

(57) ABSTRACT

A pixel structure suitable for disposing between a first scan line and a second scan line of a multi-domain vertical alignment liquid crystal display (MVA LCD) panel is provided. The pixel structure includes a first active device, a second active device, a first pixel electrode, a second pixel electrode and alignment members. The first active device is electrically connected with the first scan line and a data line of the LCD panel, and the second active device is also electrically connected therewith. The first and the second pixel electrode are electrically connected to the first and the second active device, respectively, and the first pixel electrode covers a part of the second scan line to form a compensation capacitance. Therefore, there is a voltage difference between the second pixel electrode and the first pixel electrode. The alignment members are disposed on the first and the second pixel electrode.

4 Claims, 4 Drawing Sheets

LIQUID CRYSTAL DISPLAY PIXEL STRUCTURE HAVING SUB-PIXELS WITH PARTICULAR CAPACITANCE

CROSS-REFERENCE TO RELATED APPLICATION

This application claims the priority benefit of Taiwan application Ser. No. 95141291, filed Nov. 8, 2006. All disclosure of the Taiwan application is incorporated herein by reference.

BACKGROUND OF THE INVENTION

1. Field of the Invention

The present invention relates to a pixel structure of a liquid crystal display panel, and more particularly to the pixel structure of a multi-domain vertical alignment liquid crystal display (MVA-LCD) panel.

2. Description of Related Art

The development trend of the existing liquid crystal displays (LCD) is mainly aiming toward greater brightness, higher contrast, larger display area and wider viewing angle. To improve the viewing angle of the LCD, a number of techniques have been proposed. At present, the more common types of wide viewing LCD techniques include multi-domain vertical alignment (MVA) LCD, in-plane switching (IPS) LCD and fringe field switching (FFS) LCD.

FIG. 1 is a top view of a conventional pixel structure applied to a multi-domain vertical alignment liquid crystal display. As shown in FIG. 1, the pixel structure 100 is disposed on a thin film transistor (TFT) array substrate. The pixel structure 100 includes a scan line 110, a data line 120, a thin film transistor (TFT) 130, a pixel electrode 140 and a protrusion 150. The thin film transistor 130 includes a gate 132, a semiconductor layer 134, a source 136a, a drain 136b and a contact hole 138. The gate 132 is electrically connected with the scan line 110, and the semiconductor layer 134 is disposed above the gate 132. The source 136a and the drain 136b are disposed on the semiconductor layer 134, and the source 136a is electrically connected to the data line 120.

The pixel electrode 140 is electrically connected with the drain 136b through the contact hole 138. Furthermore, in order to produce multi-domain vertical alignment of the liquid crystal molecules, the protrusion 150 is disposed on the pixel electrode 140 and a plurality of protrusions (not shown) is disposed on a corresponding color filter substrate (not shown). Therefore, through the protrusion 150 and its matching protrusions, the liquid crystal molecules disposed between the thin film transistor array substrate and the color filter substrate can be arranged in many directions so that a wide viewing effect is achieved.

Although the foregoing MVA LCD panel has a wider viewing angle, the transmission rate of the MVA LCD panel relative to the gray level gamma curve is different when the viewing angle changes from 0° to 90°. More specifically, as the viewing angle is changed, the degree of distortion of the hue and brightness across the picture provided by the MVA LCD is increasingly obvious.

SUMMARY OF THE INVENTION

The present invention directs to a pixel structure for reducing the degree of distortion of hue and brightness due to a change in the viewing angle.

The present invention also directs to another pixel structure for improving display quality.

The invention provides a pixel structure which is suitable to be disposed between a first scan line and a second scan line of an active device array substrate in a multi-domain vertical alignment liquid crystal display (MVA LCD) panel. Moreover, the pixel structure is controlled by the first scan line and a data line of the active device array substrate. The pixel structure includes a first active device, a second active device, a first pixel electrode, a second pixel electrode and a plurality of alignment members. The first active device is electrically connected with the first scan line and the data line, and the second active device is also electrically connected therewith. The first pixel electrode is electrically connected with the first active device, and the first pixel electrode covers a part of the second scan line to form a compensation capacitance. The second pixel electrode is electrically connected with the second active device, and there is a voltage difference between the second pixel electrode and the first pixel electrode. The alignment members are disposed on the first pixel electrode and the second pixel electrode.

In an embodiment of the present invention, the pixel structure farther includes a common line disposed under the first pixel electrode and the second pixel electrode.

In an embodiment of the present invention, the width-to-length ratio of the channels of the first active device and the second active device can be identical.

In an embodiment of the present invention, the first active device and the second active device can have a common source.

In an embodiment of the present invention, the alignment members can be protrusions or slits.

Accordingly, because the pixel structure of the present invention uses two pixel electrodes such that one of the pixel electrodes cover a part of the scan line to form a compensation capacitance, a voltage difference is produced between the two pixel electrodes. The voltage difference can arrange the liquid crystal molecules located above the two pixel electrodes at different inclination angles so as to lower the degree of change of the transmission rate of the MVA LCD panel relative to the gray level gamma curve at different viewing angles.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
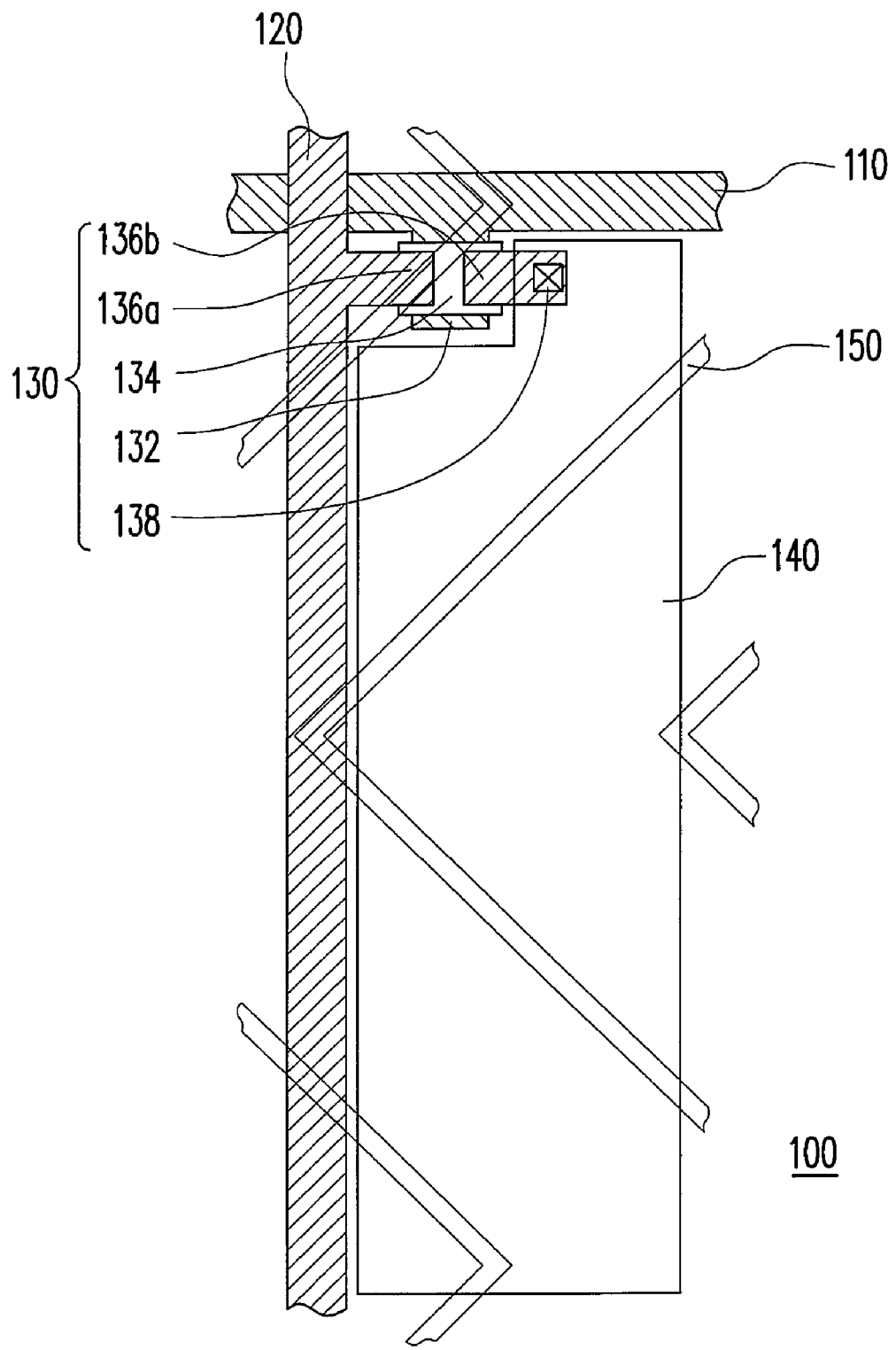
FIG. 1 is a top view of a conventional pixel structure applied to a multi-domain vertical alignment liquid crystal display.

Reference will now be made in detail to the present preferred embodiments of the invention, examples of which are illustrated in the accompanying drawings. Wherever possible, the same reference numbers are used in the drawings and the description to refer to the same or like parts.

Figure 2:
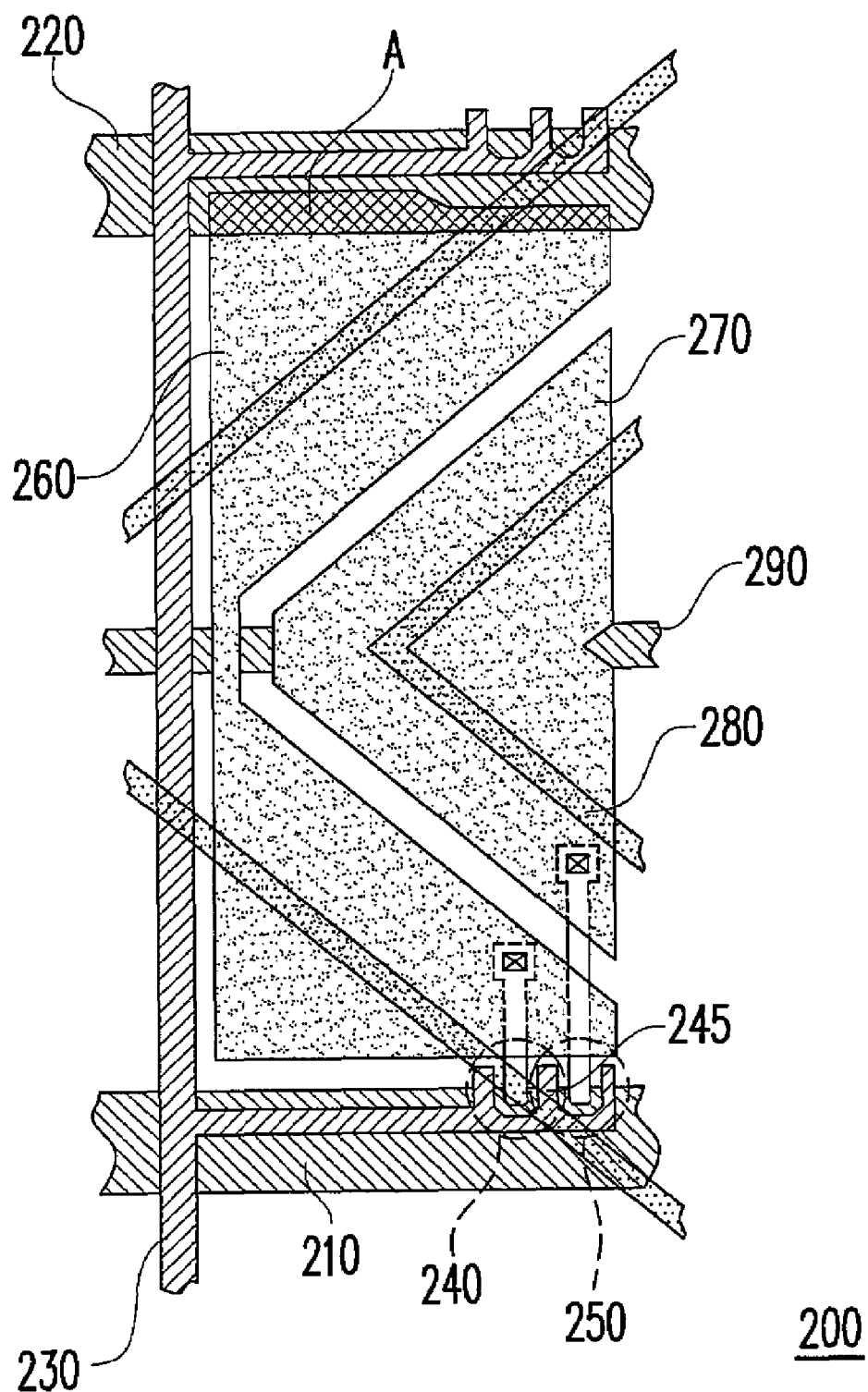
FIG. 2 is a top view of a pixel structure according to an embodiment of the present invention.

FIG. 2 is a top view of a pixel structure according to an embodiment of the present invention. As shown in FIG. 2, the pixel structure 200 in the present embodiment is suitable for disposing between a first scan line 210 and a second scan line 220 of an active device array substrate in a multi-domain vertical alignment liquid crystal display (MVA LCD) panel and controlled by the first scan line 210 and a data line 230 of the active device array substrate. The pixel structure 200 includes a first active device 240, a second active device 250, a first pixel electrode 260, a second pixel electrode 270 and a plurality of alignment members 280. The first active device 240 is electrically connected with the first scan line 210 and the data line 230, and the second active device 250 is also electrically connected therewith. The first pixel electrode 260 is electrically connected with the first active device 240 and the second pixel electrode 270 is electrically connected with the second active device 250. In addition, the first pixel electrode 260 overlaps a part of the second scan line 220 to form a compensation capacitance in the overlapping area A. The alignment members 280 are disposed on the first pixel electrode 260 and the second pixel electrode 270.

In the present embodiment, the first active device 240 and the second active device 250 are, for example, thin film transistors or other switching devices with three terminals. For the first pixel electrode 260 and the second pixel electrode 270 to produce a similar flickering effect, the first active device 240 and the second active device 250 preferably have very close electrical performance. For example, when both the first active device 240 and the second active device 250 are thin film transistors, the width-to-length ratio of the two could be identical. In the present embodiment, the almost electrically identical first active device 240 and the second active device 250 are electrically connected to the first pixel electrode 260 and the second pixel electrode 270 respectively so that the first pixel electrode 260 and the second pixel electrode 270 can be charged to the same voltage at the same time. Because of the action of the compensation capacitance formed in the overlapping area A, a voltage difference exists between the first pixel electrode 260 and the second pixel electrode 270 after the first pixel electrode 260 and the second pixel electrode 270 are charged.

More specifically, due to the existence of a voltage difference between the first pixel electrode 260 and the second pixel electrode 270, the inclination angles of the liquid crystal molecules located above the first pixel electrode 260 and the second pixel electrode 270 are different. Hence, the degree of change of the transmission rate relative to the gray level gamma curve at different viewing angles is reduced. Consequently, a MVA LCD using the pixel structure 200 of the present invention can provide better display quality.

In addition, the pixel structure 200 in the present embodiment further includes a common line 290 disposed under the first pixel electrode 260 and the second pixel electrode 270 to form a storage capacitance. In other words, the storage capacitance structure in the present embodiment is a storage capacitance on common line (Cst on common). However, the storage capacitance structure of the present invention is not limited to the storage capacitance on common line (Cst on common). In another embodiment, the storage capacitance structure can also be a storage capacitance on scan line (Cst on gate) formed, for example, by an overlapping part between the second pixel electrode 270 and the second scan line 220.

In the present embodiment, the active device 240 and the second active device 250 have a common source 245. However, in another embodiment, the first active device 240 and the second active device 250 can have independent sources. In addition, the alignment members 280 in the present embodiment are protrusions. However, in another embodiment, the alignment members 280 can also be slits. In the following, an equivalent circuit of the present embodiment is described.

Figure 3:
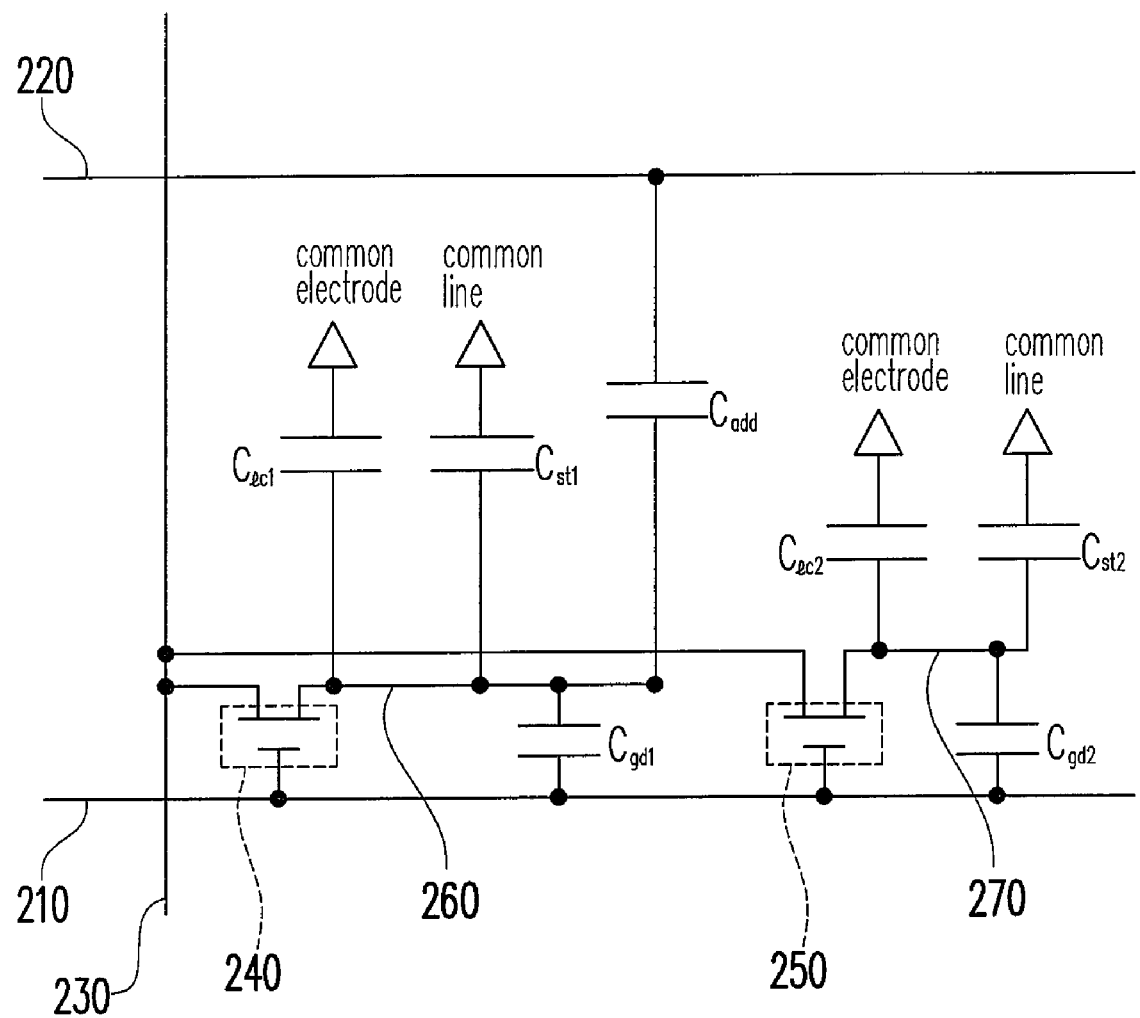
FIG. 3 is an equivalent circuit diagram of the pixel structure in FIG. 2.

FIG. 3 is an equivalent circuit diagram of the pixel structure in FIG. 2. As shown in FIG. 3, $C_{lc1}$ represents the liquid crystal capacitance formed by the first pixel electrode 260 and a common electrode of an opposition substrate, $C_{st1}$ represents the first storage capacitance formed by the first pixel electrode 260 and the common line 290, $C_{add}$ represents the compensation capacitance formed by the first pixel electrode 260 and the second scan line 220, $C_{gd1}$ represents the first parasitic capacitance formed by the first active device 240 and the first scan line 210, $C_{lc2}$ represents the second liquid crystal capacitance formed by the second pixel electrode 270 and the common electrode, $C_{st2}$ represents the second storage capacitance formed by the second pixel electrode 270 and the common line 290 and $C_{gd2}$ represents the second parasitic capacitance formed by the second active device 250 and the first scan line 210. For the first pixel electrode 260 and the second pixel electrode 270 to produce a similar flickering effect, the first active device 240 and the second active device 250 preferably have very close electrical performance. In other words, the first parasitic capacitance $C_{gd1}$ and the second parasitic capacitance $C_{gd2}$ are preferably the same.

Figure 4A:
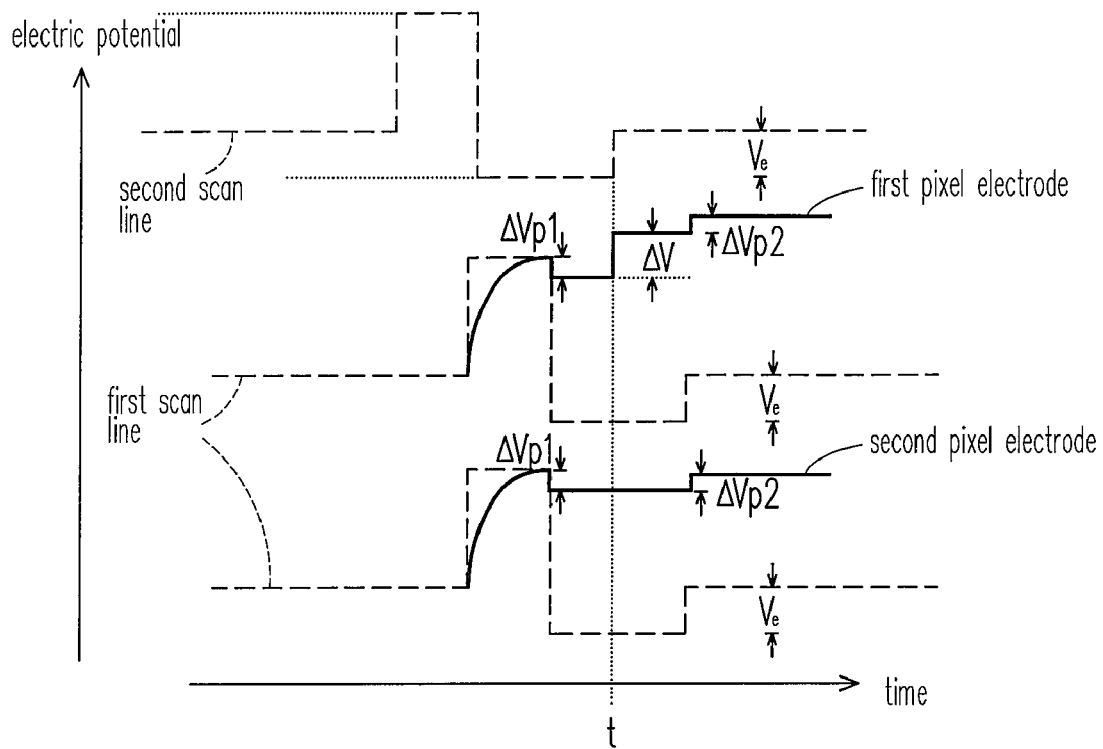
FIG. 4A is a waveform diagram of the first pixel electrode and the second pixel electrode of FIG. 2 charging under a positive condition.

FIG. 4A is a waveform diagram of the first pixel electrode and the second pixel electrode of FIG. 2 charging under a positive condition, wherein the horizontal axis is the time and the vertical axis is the potential, and the scan line uses a three stage driving method. As shown in FIGS. 3 and 4A, for the first pixel electrode 260 and the second pixel electrode 270 to produce a similar flickering effect, the first active device 240 and the second active device 250 can be designed to be electrically identical, and furthermore, $C_{add}+C_{lc1}+C_{st1}=C_{lc2}+C_{st2}$. Therefore, the feed through voltage $\Delta V_p$ of the first pixel electrode 260 and the second pixel electrode 270 will be the same, wherein $\Delta V_p=\Delta V_{p1}-\Delta V_{p2}$. Consequently, the flickering effect produced by the first pixel electrode 260 and the second pixel electrode 270 are the same.

More specifically, when the first pixel electrode 260 and the second pixel electrode 270 are charged with a positive polarity, the first pixel electrode 260 and the second pixel electrode 270 are charged to the same potential at the same time. However, the potential of the second scan line 220 is increased at time t and the risen quantity is called a kick-back voltage $V_e$. The kick-back voltage $V_e$ makes the potential of the first pixel electrode 260 increase $\Delta V$ through the action of the compensation capacitance $C_{add}$, wherein $\Delta V=C_{add}*V_e/(C_{st1}+C_{lc1}+C_{add}+C_{gd1})$. Therefore, a voltage difference $\Delta V$ exists between the first pixel electrode 260 and the second pixel electrode 270 after time t so that the inclination angles of the liquid crystal molecules located above the first pixel electrode 260 and the second pixel electrode 270 are different.

Figure 4B:
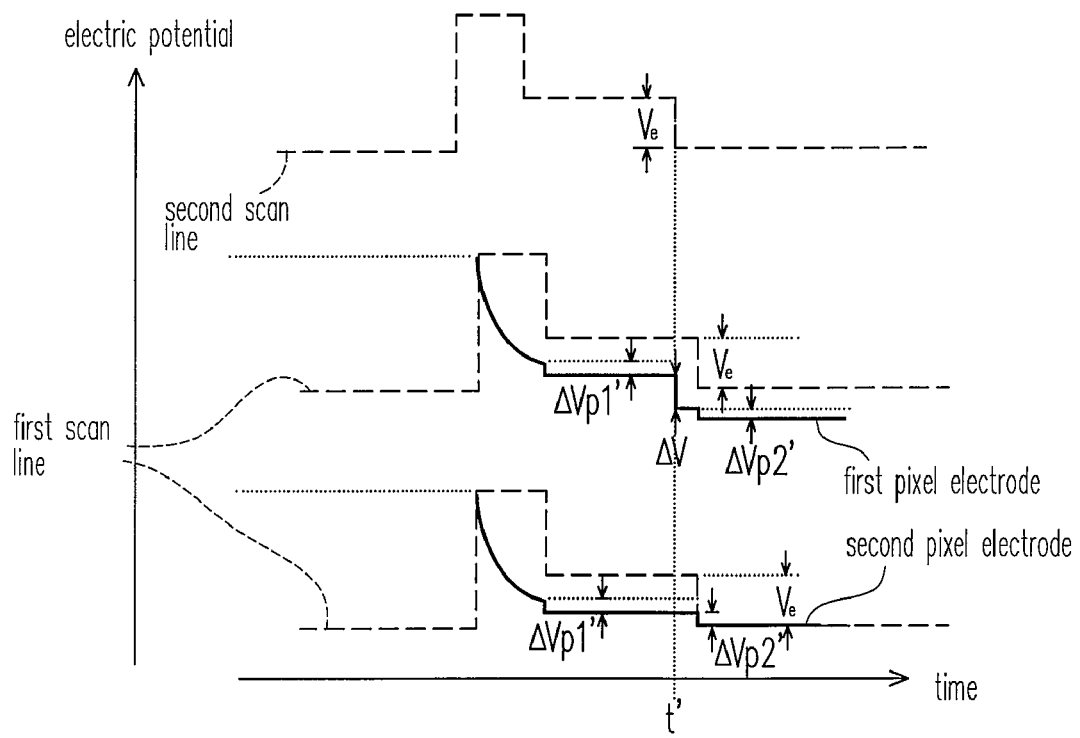
FIG. 4B is a waveform diagram of the first pixel electrode and the second pixel electrode of FIG. 2 charging under a negative condition.

FIG. 4B is a waveform diagram of the first pixel electrode and the 5 second pixel electrode of FIG. 2 charging under a negative condition, wherein the horizontal axis is the time and the vertical axis is the potential, and the scan line uses a three stage driving method. As shown in FIGS. 3 and 4B, a voltage difference ΔV exists between the first pixel electrode 260 and the second pixel electrode 270 after time t'. The reason for having the voltage difference ΔV is the same as that in FIG. 4A, and so a detailed description is omitted. In FIG. 4B, the feed through voltage $\Delta V_p = \Delta V_{p1}' + \Delta V_{p2}'$, and the voltage difference between the first pixel electrode 260 and the second pixel electrode 270 is $\Delta V = C_{add} * V_e / (C_{st1} + C_{lc1} + C_{add} + C_{gd1})$.

Although the present embodiment is illustrated using a scan line that deploys a three stage driving method, the scan line in the present embodiment can deploy a fourth stage driving method or other modes of driving.

In summary, the pixel structure of the present invention uses two pixel electrodes with one of the pixel electrodes covering a part of the scan line to form a compensation capacitance. Thus, the two pixel electrodes can produce a voltage difference. The voltage difference drives the liquid crystal molecules above the two pixel electrodes to different inclination angles so that the degree of change of the transmission rate of the MVA LCD panel relative to the gray level gamma curve at different viewing angles are lowered. Therefore, a multi-domain vertical alignment liquid crystal display using the pixel structure of the present invention can have better display quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure of a multi-domain vertical alignment liquid crystal display (MVA LCD) panel, comprising:
    a first substrate comprising:
       a first scan line, a second scan line and a data line;
       a first active device electrically connected with the first scan line and the data line, wherein a first parasitic capacitance exists between the first active device and the first scan line;
       a second active device electrically connected with the first scan line and the data line, wherein a second parasitic capacitance exists between the second active device and the first scan line, and the first parasitic capacitance is equal to the second parasitic capacitance;
       a first pixel electrode electrically connected to the first active device, and the first pixel electrode covers a part of the second scan line to form a compensation capacitance (Cadd);
       a second pixel electrode electrically connected with the second active device, and there is a voltage difference between the second pixel electrode and the first pixel electrode;
       a plurality of alignment members disposed on the first pixel electrode and the second pixel electrode;
       a common line, disposed under the first and second pixel electrodes, wherein a first storage capacitance (Cst1) exists between the first pixel electrode and the common line and a second storage capacitance (Cst2) exists between the second pixel electrode and the common line;
    a second substrate having a common electrode thereon, opposite to the first substrate; and
    a liquid crystal layer, between the first and second substrates, wherein a first liquid crystal capacitance (Clc1) exists between the first pixel electrode and the common electrode, a second liquid crystal capacitance (Clc2) exists between the second pixel electrode and the common electrode, and Cadd+Clc1+Cst1=Clc2+Cst2.

2. The pixel structure of claim 1, wherein channels of the first active device and the second active device have an identical length-to-width ratio.

3. The pixel structure of claim 1, wherein the first active device and the second active device have a common source.

4. The pixel structure of claim 1, wherein the alignment members comprise protrusions or slits.

* * * * *